US011887529B2

(12) United States Patent

Wang et al.

(10) Patent No.: US 11,887,529 B2
(45) Date of Patent: Jan. 30, 2024

(54) PIXEL ARRAY

(71) Applicant: Au Optronics Corporation, Hsinchu (TW)

(72) Inventors: Ya-Jung Wang, Hsinchu (TW); Jing-Wun Jhang, Hsinchu (TW); Rong-Fu Lin, Hsinchu (TW); Nien-Chen Li, Hsinchu (TW); Hsien-Chun Wang, Hsinchu (TW); Che-Chia Chang, Hsinchu (TW); June Woo Lee, Hsinchu (TW); Hsin-Ying Lin, Hsinchu (TW); Chia-Ting Hsieh, Hsinchu (TW); Chien-Fu Huang, Hsinchu (TW); Sung-Yu Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 141 days.

(21) Appl. No.: 17/723,472

(22) Filed: Apr. 19, 2022

(65) Prior Publication Data

US 2022/0335886 A1 Oct. 20, 2022

Related U.S. Application Data

(60) Provisional application No. 63/177,345, filed on Apr. 20, 2021.

(30) Foreign Application Priority Data

Mar. 22, 2022 (TW) ................................. 111110687

(51) Int. Cl.
*G09G 3/32* (2016.01)

(52) U.S. Cl.
CPC ......... *G09G 3/32* (2013.01); *G09G 2330/021* (2013.01)

(58) Field of Classification Search
CPC ........ G09G 3/32; G09G 3/3233; G09G 3/325; G09G 3/3258; G09G 3/3291;
(Continued)

(56) References Cited

U.S. PATENT DOCUMENTS 10,891,896 B2 * 1/2021 Wu ...................... G09G 3/3233
11,011,105 B2 * 5/2021 Wang ...................... G09G 3/32
(Continued)

FOREIGN PATENT DOCUMENTS

TW 201121368 6/2011

*Primary Examiner* — Vijay Shankar
(74) *Attorney, Agent, or Firm* — JCIPRNET

(57) ABSTRACT

A pixel array is provided. The pixel array includes a plurality of pixels, wherein each of the pixels includes a light emitting diode, a first transistor, a second transistor, a third transistor, a fourth transistor, and a fifth transistor. The first transistor receives a first data signal and a first scan signal. The second transistor is coupled to the first transistor and an anode of the light emitting diode. The third transistor receives a system high voltage and a first control signal, and is coupled to the second transistor. The fourth transistor is coupled to an anode of a light emitting diode of an adjacent pixel, a control terminal of the third transistor, and a cathode of the light emitting diode. The fifth transistor is coupled to the cathode of the light emitting diode, and receives a second control signal and a system low voltage.

8 Claims, 6 Drawing Sheets

(58) Field of Classification Search
CPC ..... G09G 2330/021; G09G 2300/0452; G09G 2300/0819; G09G 2300/0861; G09G 2320/045; G09G 2320/0233
See application file for complete search history.

(56) References Cited

U.S. PATENT DOCUMENTS

| | | | | |
|---|---|---|---|---|
| 11,514,852 | B2 * | 11/2022 | Wang | G09G 3/32 |
| 2021/0056889 | A1 * | 2/2021 | Wang | G09G 3/32 |
| 2022/0335887 | A1 * | 10/2022 | Wang | G09G 3/32 |

* cited by examiner

PIXEL ARRAY

CROSS-REFERENCE TO RELATED APPLICATION

This application claims the priority benefit of U.S. provisional application Ser. No. 63/177,345, filed on Apr. 20, 2021, and Taiwan application serial no. 111110687, filed on Mar. 22, 2022. The entirety of each of the above-mentioned patent applications is hereby incorporated by reference herein and made a part of this specification.

BACKGROUND

Technical Field

The disclosure relates to a pixel array, and in particular relates to a light emitting diode pixel array.

Description of Related Art

Due to the rising awareness of environmental protection, the demands for energy and power saving, service life, color saturation, and power quality have gradually become factors that consumers consider in their purchases. At the same time, due to the rapid development and cost reduction of light emitting diode (LED) chips, light emitting diodes have become the mainstream development in future lighting and display markets.

Since the light emitting diode is a current-driven element (that is, the accumulated current flowing through the light emitting diode determines the brightness of the light emitting diode), increasing the recycling efficiency of the current is an efficient solution for improving the power utilization of a light emitting diode panel.

SUMMARY

The disclosure provides a pixel array, which may increase the recycling efficiency of a current to improve the power utilization of a panel.

The pixel array of the disclosure includes multiple pixels, in which each of the pixels includes a light emitting diode, a first transistor, a second transistor, a third transistor, a fourth transistor, and a fifth transistor. The light emitting diode has an anode and a cathode. The first transistor has a first terminal that receives a first data signal, a control terminal that receives a first scan signal, and a second terminal. The second transistor has a first terminal, a control terminal coupled to the second terminal of the first transistor, and a second terminal coupled to the anode of the light emitting diode. The third transistor has a first terminal that receives a system high voltage, a control terminal that receives a first control signal, and a second terminal coupled to the first terminal of the second transistor. The fourth transistor has a first terminal coupled to an anode of a light emitting diode of an adjacent pixel, a control terminal coupled to the control terminal of the third transistor, and a second terminal coupled to the cathode of the light emitting diode. The fifth transistor has a first terminal coupled to the cathode of the light emitting diode, a control terminal that receives a second control signal, and a second terminal that receives a system low voltage.

Based on the above, in the pixel array according to the embodiment of the disclosure, when each of the light emitting signals is enabled, the second transistor, the third transistor, and the fourth transistor of the pixel of the present level are turned on, and the fifth transistor of the pixel of the previous level is turned on, so that the current passes through the light emitting diodes of the pixels of the present level and the previous level. Thereby, the pixel array has the effect of saving power.

In order to make the aforementioned features and advantages of the disclosure comprehensible, embodiments accompanied with drawings are described in detail below.

DETAILED DESCRIPTION OF DISCLOSED EMBODIMENTS

Unless otherwise defined, all terms (including technical and scientific terms) used herein have the same meanings as those commonly understood by one of ordinary skill in the art to which this disclosure belongs. It should be further understood that terms such as those defined in commonly used dictionaries should be construed as having meanings consistent with their meanings in the context of the related art and the disclosure, and are not to be construed as having idealized or excessively formal meanings, unless expressly defined as such herein.

It should be understood that, although the terms "first", "second", "third", or the like may be used herein to describe various elements, components, regions, layers, and/or portions, these elements, components, regions, and/or portions should not be limited by these terms. These terms are only used to distinguish one element, component, region, layer, or portion from another element, component, region, layer, or portion. Thus, "a first element", "component", "region", "layer", or "portion" discussed below may be referred to as a second element, component, region, layer, or portion without departing from the teachings herein.

The terminology used herein is for the purpose of describing particular embodiments only and is not limiting. As used herein, the singular forms "a", "an", and "the" are intended to include the plural forms including "at least one" unless the content clearly dictates otherwise. "Or" means "and/or". As used herein, the term "and/or" includes any and all combinations of one or more of the associated listed items. It should also be understood that, when used in this specification, the term "including" or "includes" specifies the presence of a stated feature, region, whole subject, step, operation, element, and/or part, but does not exclude the presence or addition of one or more other features, regions, whole subjects, steps, operations, elements, parts, and/or a combination thereof.

Figure 1:
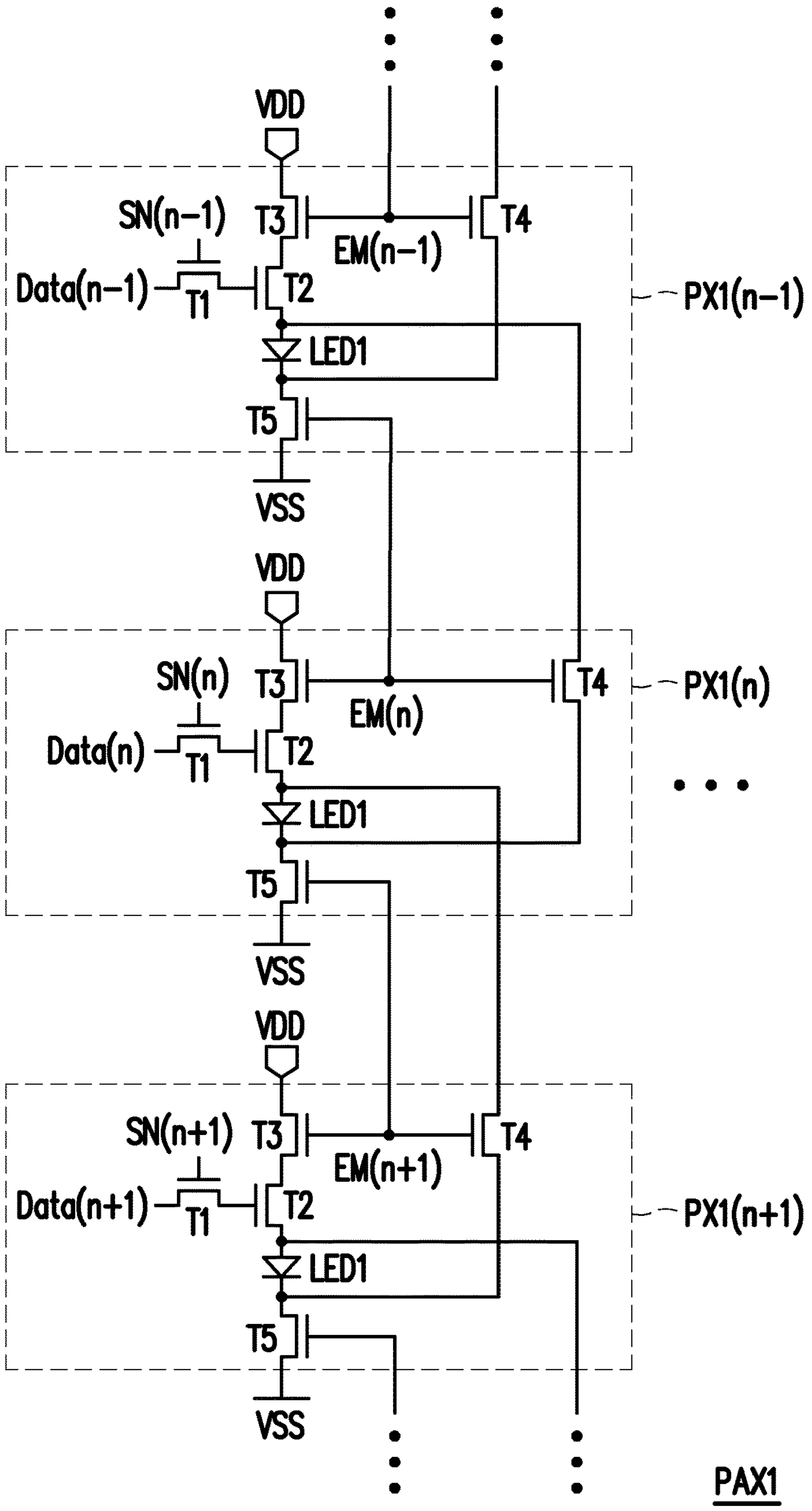
FIG. 1 is a schematic circuit diagram of a pixel array according to the first embodiment of the disclosure.

FIG. 1 is a schematic circuit diagram of a pixel array according to the first embodiment of the disclosure. Referring to FIG. 1, in this embodiment, a pixel array PAX1 includes multiple pixels (for example, the pixels PX1($n$−1)

to PX1(*n*+1)), in which the pixels PX1(*n*−1) to PX1(*n*+1) are arranged in an array and may be driven by an impulse driving mode, and n is an index number.

In this embodiment, each of the pixels (for example, the pixels PX1(*n*−1) to PX1(*n*+1)) includes a light emitting diode LED1, a first transistor T1, a second transistor T2, a third transistor T3, a fourth transistors T4, and a fifth transistor T5. The light emitting diode LED1 has an anode and a cathode. The first transistor T1 has a first terminal that receives a first data signal (for example, data signals Data (n−1) to Data(n+1)), a control terminal that receives a first scan signal (for example, the scan signals SN(n−1) to SN(n+1)), and a second terminal. The second transistor T2 has a first terminal, a control terminal coupled to the second terminal of the first transistor T1, and a second terminal coupled to the anode of the light emitting diode LED1.

The third transistor T3 has a first terminal that receives a system high voltage VDD, a control terminal that receives a first control signal (for example, the light emitting signals EM(n−1) to EM(n+1)), and a second terminal coupled to the first terminal of the second transistor T2. The fourth transistor T4 has a first terminal coupled to the anode of the light emitting diode LED1 of the vertically adjacent pixel (for example, the pixels PX1(*n*−1) to PX1(*n*+1)), a control terminal coupled to the control terminal of the third transistor T3, and a second terminal coupled to the cathode of the light emitting diode LED1. The fifth transistor T5 has a first terminal coupled to the cathode of the light emitting diode LED1, a control terminal that receives a second control signal (for example, the light emitting signals EM(n−1) to EM(n+1)), and a second terminal that receives a system low voltage VSS.

Furthermore, taking the pixel PX1(*n*) as an example, the first terminal of the first transistor T1 receives the data signal Data(n), and the control terminal of the first transistor T1 receives the scan signal SN(n). The control terminal of the third transistor T3 receives the light emitting signal EM(n). In addition, the control terminal of the fifth transistor T5 receives the light emitting signal EM(n+1).

Figure 2:
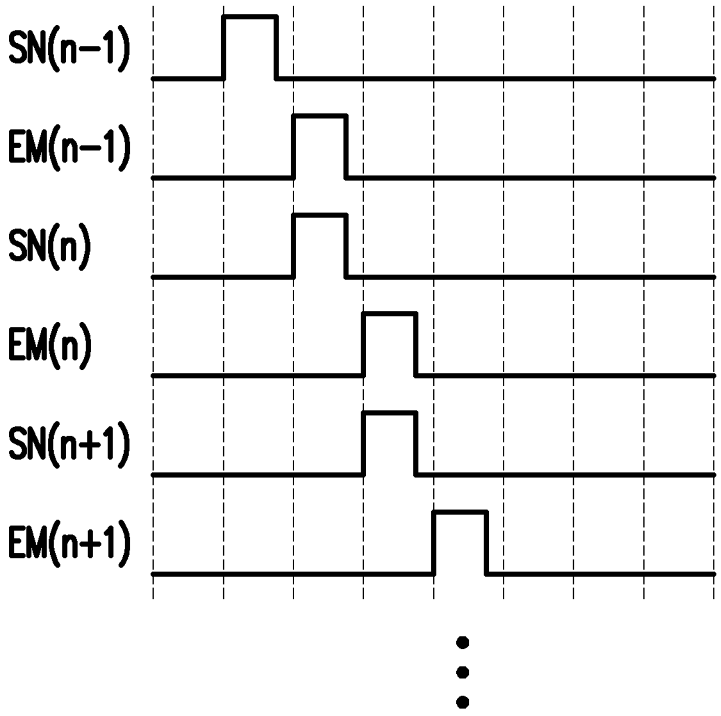
FIG. 2 is a schematic diagram of driving waveforms of a pixel array according to an embodiment of the disclosure.

FIG. 2 is a schematic diagram of driving waveforms of a pixel array according to an embodiment of the disclosure. Referring to FIG. 1 and FIG. 2, as shown in FIG. 2, the scan signals SN(n−1) to SN(n+1) are sequentially enabled according to time. That is, the enabling level periods of the scan signals SN(n−1) to SN(n+1) are sequentially formed according to time.

In addition, the light emitting signals EM(n−1) to EM(n+1) are sequentially enabled according to time. That is, the light emitting signals EM(n−1) to EM(n+1) are sequentially formed according to time. For the pixel PX1(*n*), the enabling level period of the light emitting signal EM(n) is later than the enabling level period of the scan signal SN(n) but earlier than the enabling level period of the light emitting signal EM(n+1).

Taking the driving of the pixel PX1(*n*) as an example, when the scan signal SN(n) is enabled, the data signal Data(n) is written. Next, when the light emitting signal EM(n) is enabled, the third transistor T3 and the fourth transistor T4 of the pixel PX1(*n*) are turned on, the fifth transistor T5 of the pixel PX1(*n*−1) is turned on, and the conduction level of the second transistor T2 of the pixel PX1(*n*) reflects the voltage level of the data signal Data(n). At this time, the current starts flowing from the system high voltage VDD through the second transistor T2, the third transistor T3, the light emitting diode LED1, and the fourth transistor T4 of the pixel PX1(*n*), then the light emitting diode LED1 and the fifth transistor T5 of the pixel PX1(*n*−1), and to the system low voltage VSS.

According to the above, the current of the pixel of each of the levels (such as the pixels PX1(*n*−1) to PX1(*n*+1)) flows through the light emitting diodes LED1 of the pixels of the present level and the previous level (such as the pixels PX1(*n*−1) to PX1 (n+1)) in a manner of a series connection, thereby achieving the effect of saving power.

Figure 3:
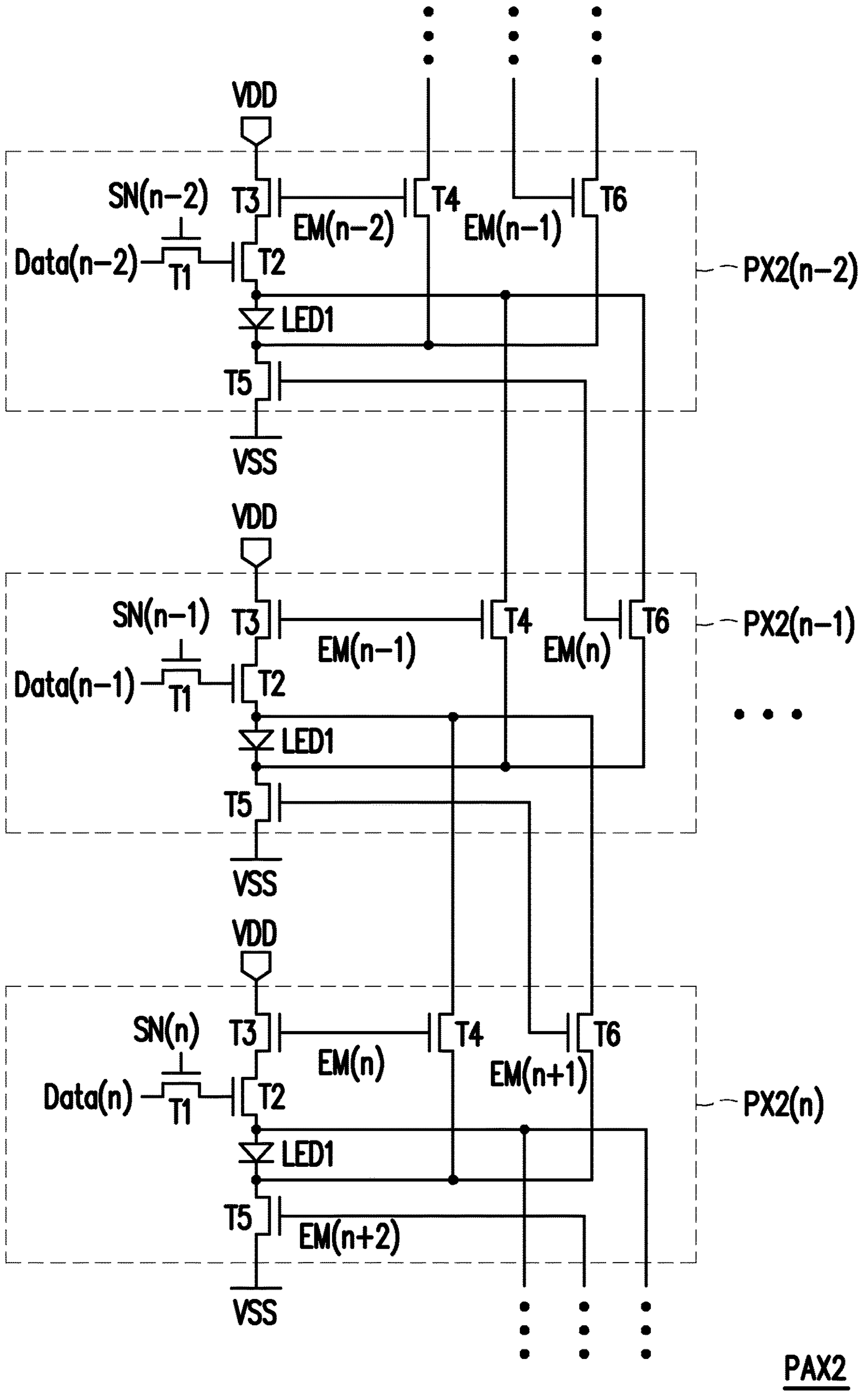
FIG. 3 is a schematic circuit diagram of a pixel array according to the second embodiment of the disclosure.

FIG. 3 is a schematic circuit diagram of a pixel array according to the second embodiment of the disclosure. Referring to FIG. 1 and FIG. 3, a pixel array PAX2 is substantially the same as the pixel array PAX1, with the difference being that the pixels (for example, the pixels PX2(*n*−2) to PX2(*n*)) of the pixel array PAX2 further include a sixth transistor T6, in which the same or similar elements are provided with the same or similar reference numerals. The sixth transistor T6 has a first terminal coupled to the anode of the light emitting diode LED1 of the vertically adjacent pixel (for example, the pixels PX2(*n*−2) to PX2(*n*)), a control terminal that receives a third control signal (for example, the light emitting signals EM(n−2) to EM(n)), and a second terminal coupled to the cathode of the light emitting diode LED1.

Taking the pixel PX2(*n*) as an example, the first terminal of the first transistor T1 receives the data signal Data(n), and the control terminal of the first transistor T1 receives the scan signal SN(n). The control terminal of the third transistor T3 receives the light emitting signal EM(n), the control terminal of the sixth transistor T6 receives the light emitting signal EM(n+1), and the control terminal of the fifth transistor T5 receives the light emitting signal EM(n+2). Referring to FIG. 2 and FIG. 3, as shown in FIG. 2, for the pixel PX2(*n*), the enabling level period of the light emitting signal EM(n) is later than the enabling level period of the scan signal SN(n) but earlier than the enabling level period of the light emitting signal EM(n+1), and the enabling level period of the light emitting signal EM(n+2) is later than the enabling level period of the light emitting signal EM(n+1).

Taking the driving of the pixel PX2(*n*) as an example, when the scan signal SN(n) is enabled, the data signal Data(n) is written. Next, when the light emitting signal EM(n) is enabled, the third transistor T3 and the fourth transistor T4 of the pixel PX2(*n*) are turned on, the sixth transistor T6 of the pixel PX2(*n*−1) is turned on, the fifth transistor T5 of the pixel PX2(*n*−2) is turned on, and the conduction level of the second transistor T2 of the pixel PX2(*n*) reflects the voltage level of the data signal Data(n). At this time, the current starts flowing from the system high voltage VDD through the second transistor T2, the third transistor T3, the light emitting diode LED1, and the fourth transistor T4 of the pixel PX2(*n*), the light emitting diode LED1 and the sixth transistor T6 of the pixel PX2(*n*−1), and the light emitting diode LED1 and the fifth transistor T5 of the pixel PX2(*n*−2), and to the system low voltage VSS.

According to the above, the current of the pixel of each of the levels (such as pixels PX1(*n*−1) to PX1(*n*+1)) flows through the light emitting diodes LED1 of the pixels of the present level and the previous two levels (such as pixels PX1(*n*−1) to PX1 (n+1)) in a manner of a series connection, thereby achieving the effect of saving power.

Figure 4:
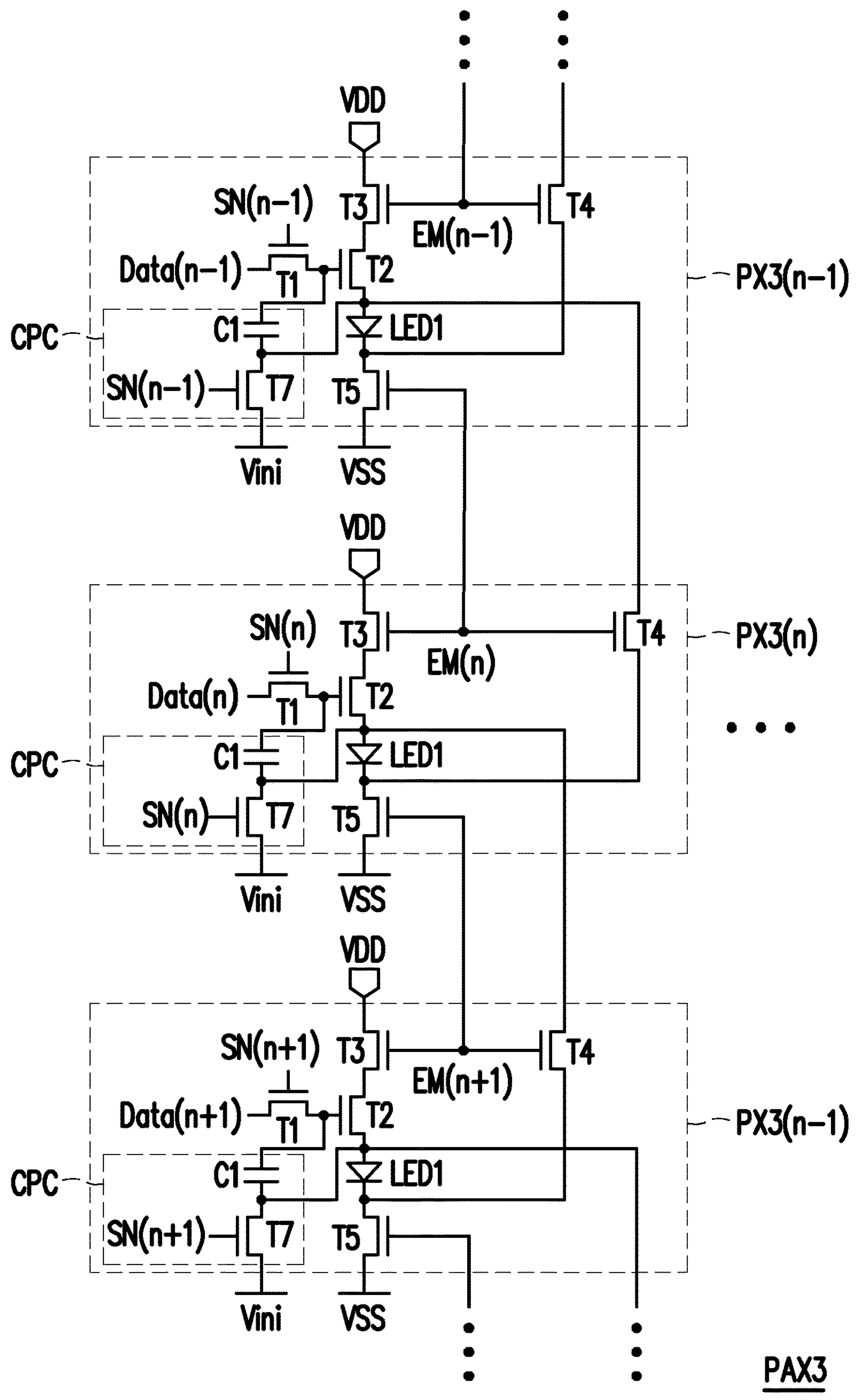
FIG. 4 is a schematic circuit diagram of a pixel array according to the third embodiment of the disclosure.

FIG. 4 is a schematic circuit diagram of a pixel array according to the third embodiment of the disclosure. Referring to FIG. 1 and FIG. 4, a pixel array PAX3 is substantially the same as the pixel array PAX1, with the difference being that the pixels (for example, the pixels PX3(*n*−1) to PX3 (*n*+1)) of the pixel array PAX3 further include a compensation circuit CPC, in which the same or similar elements are provided with the same or similar reference numerals. In this embodiment, the compensation circuit CPC is coupled to the control terminal and the second terminal of the second transistor T2 to compensate for the threshold voltage of the second transistor T2.

In this embodiment, the compensation circuit CPC includes a first capacitor C1 and a seventh transistor T7. The first capacitor C1 is coupled between the control terminal and the second terminal of the second transistor T2. The seventh transistor T7 has a first terminal coupled to the second terminal of the second transistor T2, a control terminal that receives the scan signal (for example, the scan signals SN(n−1) to SN(n+1)), and a second terminal that receives the initialization voltage Vini. The initialization voltage Vini may be set according to the threshold voltage of the second transistor T2 to compensate for the threshold voltage of the second transistor T2.

Figure 5:
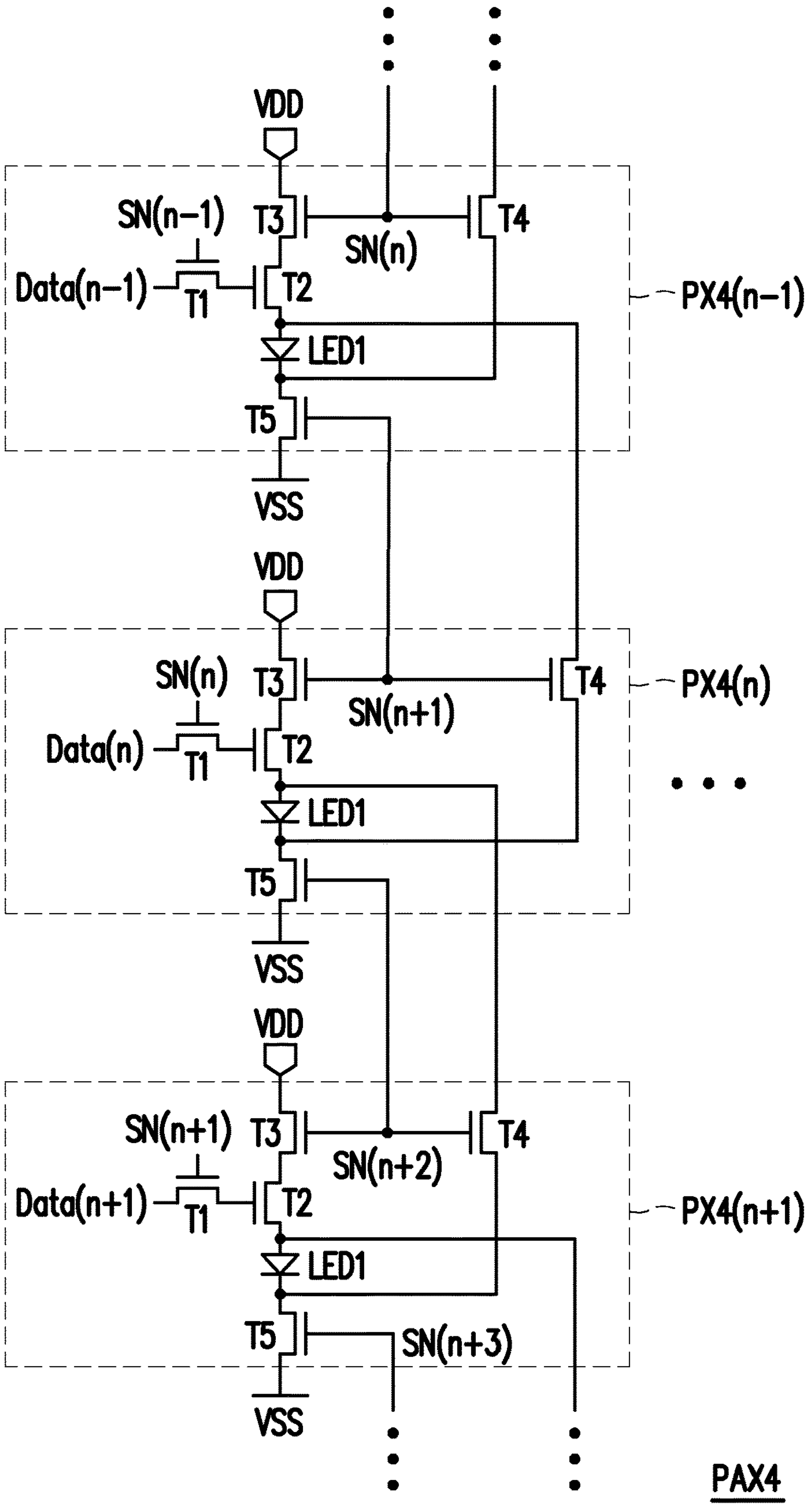
FIG. 5 is a schematic circuit diagram of a pixel array according to the fourth embodiment of the disclosure.
Figure 6:
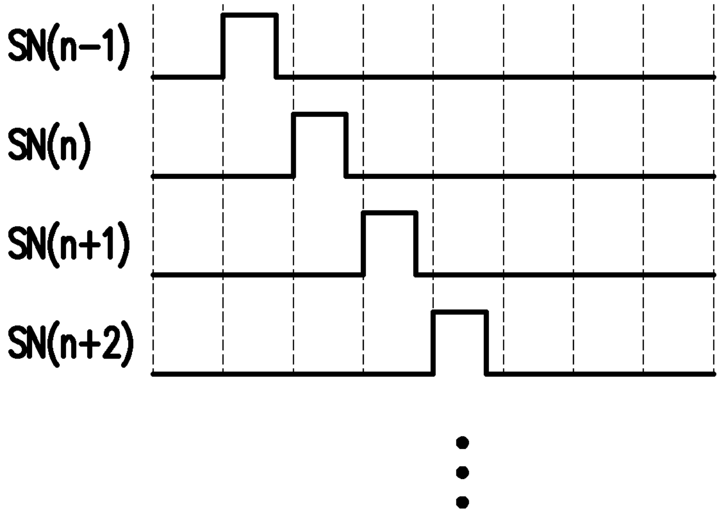
FIG. 6 is a schematic diagram of driving waveforms of a pixel array according to another embodiment of the disclosure.

FIG. 5 is a schematic circuit diagram of a pixel array according to the fourth embodiment of the disclosure. FIG. 6 is a schematic diagram of driving waveforms of a pixel array according to another embodiment of the disclosure. Referring to FIG. 1 and FIG. 5, a pixel array PAX4 is substantially the same as the pixel array PAX1, with the difference being that the pixels (for example, the pixels PX4(*n*−1) to PX4(*n*+1)) of the pixel array PAX4 only adopt scan signals (such as the scan signals SN(n−1) to SN(n+1)), in which the same or similar elements are provided with the same or similar reference numerals.

When comparing FIG. 2 with FIG. 6, the waveform of the light emitting signal EM(n+1) is substantially the same as the scan signal SN(n), and the waveform of the light emitting signal EM(n) is substantially the same as the scan signal SN(n+1). That is, the light emitting signals EM(n−1) to EM(n+1) may substantially be replaced by the scan signals (for example, the scan signals SN(n−1) to SN(n 2)). Taking the pixel PX4(*n*) as an example, the first terminal of the first transistor T1 receives the data signal Data(n), and the control terminal of the first transistor T1 receives the scan signal SN(n). The control terminal of the third transistor T3 receives the scan signal SN(n+1). In addition, the control terminal of the fifth transistor T5 receives the scan signal SN(n+2).

Similarly, the pixel array PAX2 may only adopt scan signals (for example, the scan signals SN(n−1) to SN(n+2)). Referring to FIG. 3, taking the pixel PX2(*n*) as an example, the first terminal of the first transistor T1 receives the data signal Data(n), and the control terminal of the first transistor T1 receives the scan signal SN(n). The light emitting signal EM(n) received by the control terminal of the third transistor T3 may be replaced by the scan signal SN(n+1), and the light emitting signal EM(n+1) received by the control terminal of the sixth transistor T6 may be replaced by the scan signal SN(n+2), and the light emitting signal EM(n+2) received by the control terminal of the fifth transistor T5 may be replaced by the scan signal SN(n+3).

To sum up, in the pixel array according to the embodiment of the disclosure, when each of the light emitting signals is enabled, the second transistor, the third transistor, and the fourth transistor of the pixel of the present level is turned on, and the fifth transistor of the pixel of the previous level is turned on, so that the current passes through the light emitting diodes of the pixels of the present level and the previous level. Thereby, the pixel array has the effect of saving power.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A pixel array, comprising:

a plurality of pixels, wherein each of the pixels comprises:

- a light emitting diode having an anode and a cathode;
- a first transistor having a first terminal that receives a first data signal, a control terminal that receives a first scan signal, and a second terminal;
- a second transistor having a first terminal, a control terminal coupled to the second terminal of the first transistor, and a second terminal coupled to the anode of the light emitting diode;
- a third transistor having a first terminal that receives a system high voltage, a control terminal that receives a first control signal, and a second terminal coupled to the first terminal of the second transistor;
- a fourth transistor having a first terminal coupled to an anode of a light emitting diode of an adjacent pixel, a control terminal coupled to the control terminal of the third transistor, and a second terminal coupled to the cathode of the light emitting diode; and
- a fifth transistor having a first terminal coupled to the cathode of the light emitting diode, a control terminal that receives a second control signal, and a second terminal that receives a system low voltage.

2. The pixel array according to claim 1, wherein the first control signal is a first light emitting signal, and the second control signal is a second light emitting signal, wherein an enabling level period of the first light emitting signal is later than an enabling level period of the first scan signal but earlier than an enabling level period of the second light emitting signal.

3. The pixel array according to claim 1, wherein the first control signal is a second scan signal, and the second control signal is a third scan signal, wherein an enabling level period of the second scan signal is later than an enabling level period of the first scan signal but earlier than an enabling level period of the third scan signal.

4. The pixel array according to claim 1, wherein each of the pixels further comprises:

- a sixth transistor having a first terminal coupled to the anode of the light emitting diode of the adjacent pixel, a control terminal that receives a third control signal, and a second terminal coupled to the cathode of the light emitting diode.

5. The pixel array according to claim 4, wherein the first control signal is a first light emitting signal, the third control signal is a second light emitting signal, and the second control signal is a third light emitting signal, wherein an enabling level period of the first light emitting signal is later than an enabling level period of the first scan signal but earlier than an enabling level period of the second light emitting signal, and an enabling level period of the third light emitting signal is later than the enabling level period of the second light emitting signal.

6. The pixel array according to claim 4, wherein the first control signal is a second scan signal, the third control signal is a third scan signal, and the second control signal is a fourth scan signal, wherein an enabling level period of the second scan signal is later than an enabling level period of the first scan signal but earlier than an enabling level period of the third scan signal, and an enabling level period of the fourth scan signal is later than the enabling level period of the third scan signal.

7. The pixel array according to claim 1, wherein each of the pixels further comprises a compensation circuit, coupled to the control terminal and the second terminal of the second transistor.

8. The pixel array according to claim 7, wherein the compensation circuit comprises:

a first capacitor coupled between the control terminal and the second terminal of the second transistor; and a seventh transistor having a first terminal coupled to the second terminal of the second transistor, a control terminal that receives the first scan signal, and a second terminal that receives an initialization voltage.

* * * * *